US012482074B2

(12) United States Patent
Sasaki et al.

(10) Patent No.: US 12,482,074 B2

(45) Date of Patent: Nov. 25, 2025

(54) SYSTEMS AND METHODS FOR TRAINING A MACHINE-LEARNING ALGORITHM AND APPLICATION OF A MACHINE-LEARNING MODEL FOR DENOISING IMAGES

(71) Applicant: LEICA MICROSYSTEMS CMS GMBH, Wetzlar (DE)

(72) Inventors: Hideki Sasaki, Wetzlar (DE); Chi-Chou Huang, Wetzlar (DE); Shih-Jong James Lee, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 51 days.

(21) Appl. No.: 18/391,713

(22) Filed: Dec. 21, 2023

(65) Prior Publication Data

US 2024/0212109 A1 Jun. 27, 2024

(30) Foreign Application Priority Data

Dec. 23, 2022 (DE) ......................... 102022134730.3

(51) Int. Cl.
*G06T 5/70* (2024.01)

(52) U.S. Cl.
CPC ...... *G06T 5/70* (2024.01); *G06T 2207/20081* (2013.01)

(58) Field of Classification Search
CPC ........................ G06T 5/70; G06T 2207/20081
See application file for complete search history.

(56) References Cited

U.S. PATENT DOCUMENTS

2016/0093335 A1* 3/2016 Doepke ................ H04N 1/2133 386/226
2021/0327031 A1 10/2021 Xie et al.
2022/0309618 A1* 9/2022 DeLaRosa ................ G06T 5/70
2024/0161327 A1* 5/2024 Chen ......................... G06T 3/40

OTHER PUBLICATIONS

Niklaus, Simon and Feng Liu, "Context-aware Synthesis for Video Frame Interpolation," Proceedings of the IEEE conference on computer vision and pattern recognition, Mar. 2018, IEEE, US, pp. 1701-1710.

(Continued)

*Primary Examiner* — Kyu Chae
(74) *Attorney, Agent, or Firm* — LEYDIG, VOIT & MAYER, LTD.

(57) ABSTRACT

A system for training a machine-learning algorithm for denoising images is configured to receive training data. The training data includes multiple image sets obtained from one or more series of consecutive images. Each image set includes a plurality of images obtained from a same series of consecutive images. The plurality of images of each image set includes an initial image, a middle image and a last image. The system is further configured to adjust weights of the machine-learning algorithm to obtain a trained machine-learning model, based on an output image of the machine-learning algorithm and a target image. The output image is obtained by using the initial image and the last image as input images. The target image is obtained from the middle image by applying a random shift to the middle image. The system is further configured to provide the trained machine-learning model.

17 Claims, 4 Drawing Sheets

100 120 122 110 118 112 114 180 116 130 140 142 144 154 162 166 152 146 168 170 160 164 150

(56) References Cited

OTHER PUBLICATIONS

Niklaus, Simon et al., "Video Frame Interpolation via Adaptive Separable Convolution," Proceedings of the IEEE international conference on computer vision, Oct. 2017, IEEE, US, pp. 261-270.
Niklaus, Simon et al., "Revisiting Adaptive Convolutions for Video Frame Interpolation," Proceedings of the IEEE Winter Conference on Applications of Computer Vision (WACV), Jan. 2021, IEEE, US, pp. 1098-1108.
Laine, Romain F. et al., "Imaging in focus: An introduction to denoising bioimages in the era of deep learning," International Journal of Biochemistry and Cell Biology 140, Sep. 20, 2021, Elsevier Ltd., Netherlands, pp. 1-9.

* cited by examiner

SYSTEMS AND METHODS FOR TRAINING A MACHINE-LEARNING ALGORITHM AND APPLICATION OF A MACHINE-LEARNING MODEL FOR DENOISING IMAGES

CROSS REFERENCE TO RELATED APPLICATIONS

This application claims benefit to German Patent Application No. DE 10 2022 134 730.3, filed on Dec. 23, 2022, which is hereby incorporated by reference herein.

FIELD

Embodiments of the present invention relate to a system and a method for training of a machine-learning algorithm for denoising images, e.g., microscopic images of living samples, to a trained machine-learning model, and to a system and a method for the application of such a machine-learning model.

BACKGROUND

In the field of life sciences and biology, but also in other fields of, e.g., medicine, living or other samples or microscopic samples can be examined by means of microscopes, for example. In order to minimize photobleaching and phototoxicity, for example, the energy input (like laser power) can be minimized and the frame rate, exposure time, or gain can be reduced—however, at the cost of increasing the amount of noise and not enough temporal resolution for kinetic analysis.

SUMMARY

Embodiments of the present invention provide a system for training a machine-learning algorithm for denoising images. The system includes one or more processors and one or more storage devices, and is configured to receive training data. The training data includes multiple image sets obtained from one or more series of consecutive images. Each image set includes a plurality of images obtained from a same series of the one or more series of consecutive images. The plurality of images of each image set includes an initial image, a middle image and a last image. The system is further configured to adjust weights of the machine-learning algorithm to obtain a trained machine-learning model, based on an output image of the machine-learning algorithm and a target image. The output image of the machine-learning algorithm is obtained by using the initial image and the last image as input images. The target image is obtained from the middle image by applying a random shift to the middle image. The system is further configured to provide the trained machine-learning model.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTIONS

Figure 1:
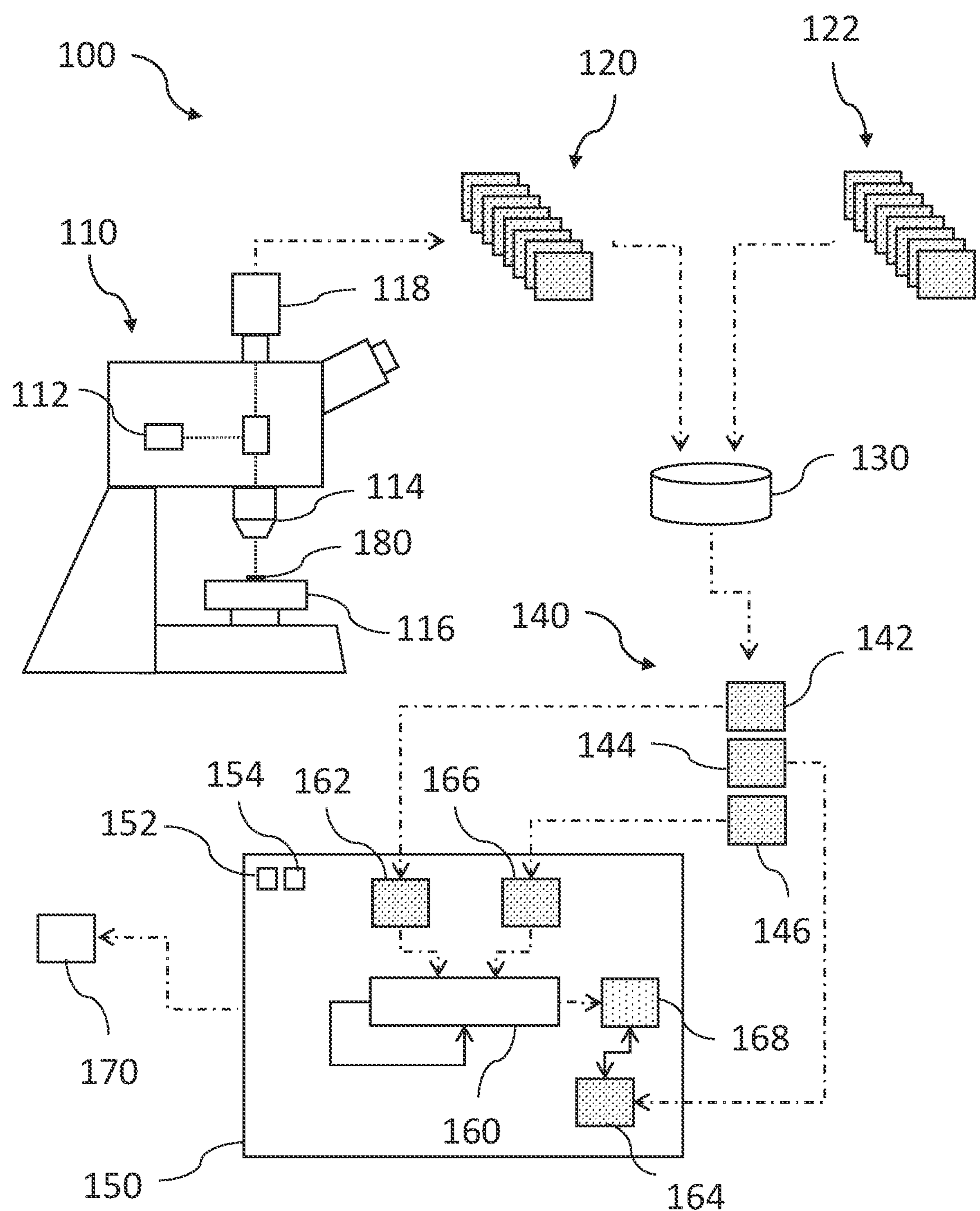
FIG. 1 schematically shows a system according to an embodiment of the invention.

In view of the situation described above, there is a need for improvement in denoising images. According to embodiments of the invention, a system and a method for training of a machine-learning algorithm for denoising images, a trained machine-learning model, and a system and a method for the application of such a machine-learning.

An embodiment of the invention relates to a system comprising one or more processors and one or more storage devices, for training of a machine-learning algorithm, e.g., an artificial neural network. The system is configured to: receive training data, adjust weights of the machine-learning algorithm based on the training data, and provide the adjusted (trained) machine-learning model. The training data comprises multiple image sets obtained from one or more series of consecutive images, wherein each image set comprises a plurality, e.g., three or more, of images obtained from the one or from the same of the more series of consecutive images. The plurality of images of each image set comprises an initial image, a middle image and a last image. It is noted that since the plurality of images is part of a series of consecutive images, the images of set implicitly have an order due to the consecutive character of the series. Adjusting the weights of the machine-learning algorithm (i.e., training the machine-learning algorithm) is done to obtain a trained machine-learning model. Adjusting is based on an output image of the machine-learning algorithm and a target image. The output image of the of the machine-learning algorithm is obtained by using the initial image and the last image as input images, and the target image is based on the middle image.

In this way, the sets of images are used to train the machine-learning algorithm, with two images of this set used as input to generate an output image, and a third one of the images of the set used as target image, in particular such that the output image is matched with the target.

In general, image denoising is the task of removing noise from an image while retaining as much as possible the true signals (from the image). Generally, data sets collected by image sensors are contaminated by noise. Imperfect instruments, problems with data acquisition process, and interfering natural phenomena can all corrupt the data of interest. Thus, noise reduction (i.e., denoising) is an important technology in image analysis and often the first step to be taken before images are (further) analyzed.

Approaches to image denoising can include spatial filtering, transforming domain filtering and wavelet thresholding methods. Another way for image denoising are deep learning (DL) based approaches, or, in general, approaches using machine-learning algorithms and models, including supervised methods using convolutional neural networks (CNN) and self-supervised methods like Noise-to-Noise (or Noise2Noise), and Noise-to-Void (or Noise2Void) for example. Deep learning (DL) methods are typically very effective for the task of image denoising even when clean reference images are not available (i.e., self-supervised learning). Noise-to-Noise, which requires only pairs of noisy images (but no clean image) to train machine-learning algorithms like deep convolutional networks for denoising, has been shown to yield results as good as approaches using pairs of noisy and clean images (Noise-to-Clean or Noise2Clean).

It has turned out that the performance of Noise-to-Noise for denoising drops when the amount of training data is reduced, limiting its capability in practical scenarios. Now, the inventors have recognized that using series of consecutive images like from time lapse imaging can provide large datasets which are, in addition, allow multiple use of individual images. A set of, e.g., three images, allows using the first and last one as the input images to generate an output image, and the middle one to define the target image for training. Since sets can overlap, the model image of one set can serve as first image of another set, for example. Each image can be part of, e.g., three different sets of images, if each set comprises three images. Thus, using time frames (images) of, e.g., time lapse images allows to significantly increase the amount of training samples used for DL training.

In addition, training of machine-learning algorithm (DL model training) typically is a very time-consuming process that requires tedious work to create training data and great efforts to optimize the trained model. Furthermore, even a small change of the earlier machine-learning model in the workflow could potentially have big impact on the performance of a machine-learning model. Training a single machine-learning algorithm using time lapse data (or other similar series of consecutive images) in a self-supervised manner can address this issue.

In an embodiment of the invention, the system is configured to adjust the weights of the machine-learning algorithm to obtain the trained machine-learning model, based on the output image of the machine-learning algorithm and the target image, by minimizing a difference between the output image and the target image. This is an easy and efficient way to match be output image and the target image.

In an embodiment of the invention, the system is further configured to obtain the target image from the middle image by applying a random shift to the middle image. Using two images from the set as input means that only noisy images are used for the training, i.e., this is a Noise-to-Noise approach The Noise-to-Noise denoising, however, cannot remove potential so-called non-i.i.d. (independent and identically distributed) noise from images. Applying a random shift to the middle image (which results in a random shift in the target image, which is based on the middle image), however, allows to also account for such non-i.i.d. noise, i.e., the machine-learning model trained or achieved this way allows to remove such non-i.i.d. noise.

In an embodiment of the invention, the plurality images of each of the image set are (e.g., three) consecutive images (or frames) of the respective series of consecutive images. In this way, deviations between these images are kept at a minimum. For example, in a time lapse imaging series of a living sample, deviations between consecutive images are less than between other images since the living sample will most likely having moved less. In this way, the two images used as input images for the training, will be almost identical, resulting in better denoising.

In an embodiment of the invention the one or the more series of consecutive images are obtained from at least one of: time lapse imaging, and one or more videos. As mentioned, time lapse imaging provides a large number of consecutive images, allowing increasing the training data. Videos often comprise even more consecutive images, e.g., 60 or 120 images per second (if a frame rate of the video is 60 or 120 fps, frames per second).

In an embodiment of the invention, the machine-learning algorithm comprises or is based on a convolutional network (convolutional neural network, CNN) or a deep convolutional (neural) network. Examples for such CNNs are RCAN (Residual Channel Attention Networks) and U-Net. U-Net is a convolutional neural network is based on the fully convolutional network and its architecture is modified and extended to work with fewer training images and to yield more precise segmentations. Segmentation of a 512×512 image takes less than a second on a modern GPU, for example. These types of machine-learning models have shown being advantageous for the described method.

Another embodiment of the invention relates to a computer-implemented method for training of a machine-learning algorithm for denoising images, wherein the machine-learning algorithm is configured to generate an output image based on two input images. The method comprises receiving training data, adjusting weights of the machine-learning algorithm to obtain a trained machine-learning model, and providing the trained machine learning model. The training data comprises multiple image sets obtained from one or more series of consecutive images, wherein each image set comprises a plurality of images obtained from the one or from the same of the more series of consecutive images, wherein the plurality of images of each image set comprise an initial image, a middle image and a last image. Adjusting the weights of the machine-learning algorithm is based on an output image of the machine-learning algorithm and a target image, wherein the output image of the of the machine-learning algorithm is obtained by using the initial image and the last image as input images. The target image is based on the middle image.

Another embodiment of the invention relates to a trained machine-learning model for denoising images. The machine-learning model is trained or achieved by receiving training data, and adjusting weights of a machine learning algorithm to obtain the trained machine-learning model. The training data comprises multiple image sets obtained from one or more series of consecutive images, wherein each image set comprises a plurality of images obtained from the one or from the same of the more series of consecutive images, wherein the plurality of images of each image set comprise an initial image, a middle image and a last image. Adjusting the weights of the machine learning algorithm is based on an output image of the machine-learning algorithm and a target image, wherein the output image of the of the machine-learning algorithm is obtained by using the initial image and the last image as input images. The target image is based on the middle image.

As to further embodiments and advantages of the method for training of the machine-learning algorithm and the trained machine-learning model it is referred to the description of the system for training the machine-learning algorithm provided above, which applies here correspondingly.

Another embodiment of the invention relates to a system comprising one or more processors and one or more storage devices, for generating a denoised image for, e.g., time lapse imaging of one or more living samples, by applying a machine-learning model. The system is configured to receive input data, wherein the input data comprises two input images obtained from a series of consecutive images, e.g., from time lapse imaging. The system is further configured to apply the machine-learning model to the two input images in order to obtain a denoised image, and to provide output data, wherein the output data comprises the denoised image. In an embodiment, the trained machine-learning model can be any of the one mentioned above or obtained by any of the embodiments described above. In this way, original images or frames of the series of consecutive images can easily and very effectively be denoised.

In an embodiment of the invention, the system is intended or used for generating the denoised image from an individual image, wherein the two input images are two copies of the individual image. As mentioned above, the machine-learning model works with two input images to generate a denoised output image. Thus, using two copies of the same image as the two input images, an individual image can be denoised using the efficient and effective machine-learning model.

In an embodiment of the invention, the system is intended or used for generating the denoised image as an interpolated image, i.e., the image to be obtained is denoised and interpolated. In this case, the two input images are two different images (from the time series). As mentioned above, the machine-learning model works with two input images to generate a denoised output image. Thus, using two different images as the two input images, the resulting image is not only denoised but at the same time an interpolation between the two input images.

In an embodiment of the invention, the two input images are two consecutive images (or frames) of the time series of images. This allows generating additional images or frames at positions (between the two consecutive ones) where no real image has been obtained.

In an embodiment of the invention, the two input images are obtained from time lapse imaging or from a video. In this way, the resulting time lapse data set or video can have a higher frame rate.

In an embodiment of the invention, one or more other denoising methods can be applied to the image which has been denoised (and probably interpolated) as explained above. In another or additional, embodiment of the invention, one or more other denoising methods can be applied to the images of the series which are used as input images, prior to the denoising (and probably interpolation) as explained above. This allows further improving denoising.

Another embodiment of the invention relates to a computer-implemented method for denoising an image by applying a machine-learning model. The method comprises receiving input data, wherein the input data comprises two input images obtained from a series of consecutive images. The method further comprises applying the machine-learning model to the two input images in order to obtain a denoised image, providing output data, wherein the output data comprises the denoised image.

As to further embodiments and advantages of the method for applying the machine-learning model it is referred to the description of the system for applying the machine-learning model provided above, which applies here correspondingly.

A further embodiment of the invention relates to a computer program with a program code for performing one or more of the methods of above, when the computer program is run on a processor.

Further advantages and embodiments of the invention will become apparent from the description and the appended figures.

It should be noted that the previously mentioned features and the features to be further described in the following are usable not only in the respectively indicated combination, but also in further combinations or taken alone, without departing from the scope of the present invention.

FIG. 1 schematically illustrates a system 150 for training of a machine-learning algorithm according to an embodiment of the invention, within an exemplary arrangement 100. The arrangement 100 comprises a microscope 110, a database 130, and the system 150. The system 150 comprises one or more processors 152 and one or more storage devices 154. For example, system 150 can be a computer or other server system.

The system 150 is configured to receive training data; such training data comprises multiple image sets 140 obtained from one or more series 120, 122 of consecutive images.

In an embodiment, the series 120 is obtained by means of the microscope 110. The microscope 110 comprises, in an embodiment, an illumination optic 112 (comprising, e.g., a light source), an objective lens 114, a sample stage 116 and an image detector 118, e.g., a camera. A sample 180, e.g., a living sample, can be provided on the microscope stage 116, and illuminated and imaged by means of the microscope 110. For example, a time lapse experiment can be performed by means of the microscope 110, generating images of the sample 180. These images can form the series 120 of consecutive images and an, for example, be stored in the database. The series 122 of consecutive images can be obtained, for example, from another microscope or in any other way and, also be stored in the database 130. In this way, training data can be obtained. It is noted that obtaining the multiple image sets 140 from the series stored in the database 130 is a mere example.

Each image set 140 (one image set is shown by means of example) comprises a plurality of images obtained from, e.g., the one series of consecutive images if only one series is used. If two or more such (different) series are used, the plurality of images should all be obtained from the same series. In an embodiment, the image set 140 comprises three images, an initial image 142, a middle image 144 and a last image 146. A series of consecutive image has an implicit order, e.g., the order in which the images have been obtained or acquired. Within a time lapse experiment, for example, an image is acquired every certain time duration, e.g., every second or every five seconds. In this way, the time of acquisition implies the order. Similar, in a video, the frames have an implicit ordering. It is noted that other kinds of ordering might be used or implicitly provided.

The system 150 is further configured to adjust weights of a machine-learning algorithm 160 to obtain a trained machine-learning model 170. This adjustment is based on based on an output image 168 of the machine-learning algorithm 160 and a target image 164. The machine-learning algorithm 160 is of such kind that it receives two input images 162, 166 and generates the output image 168 based on these two input images. The initial image 142 and the last image 146 are used as the input images.

The target image 164 is based on the middle image 144. The system 150 is further configured to provide the trained machine-learning model 170 to be used, for example, for image denoising as will later be described.

The situation shown in FIG. 1 illustrates, in an embodiment the self-supervised learning process for training a deep convolution network model (the machine-learning model) for the tasks of denoising and, preferably, frame or image interpolation. This shall, in the following, be explained in more detail based on specific formulas.

The, e.g., three images 142, 144, 146 (initial, middle and last image) of an image set 140 can, in general, be denoted as images $I_{t-1}$, $I_t$ and $I_{t+1}$. This notation applies to each set of three images obtained from a series of consecutive images, in particular, where the three images are subsequent images. The middle image is $I_t$, i.e., the image at a time t. The output image 168 of the machine-learning algorithm 160, when the initial and last images $I_{t-1}$ and $I_{t+1}$ are provided to it as input images, can be, in general, denoted as image $\hat{I}_t$, with $\hat{I}_t=f(I_{t-1}, I_{t+1})$, i.e., the output image is a function f of the two input images, obtained by the machine-learning algorithm. This output image $\hat{I}_t$ has the same size as the input images $I_{t-1}$ and $I_{t+1}$.

In an embodiment, the target image is (or is equal to) the middle image $I_t$. In this case, a loss function $\mathcal{L}_1$ of the machine-leaning algorithm (or the deep convolutional network) can be as follows:

$$\mathcal{L}_1 = \sum_t \|I_t - \hat{I}_t\| = \sum_t \|I_t - f(I_{t-1}, I_{t+1})\|$$

This loss function $\mathcal{L}_1$ is to minimize the difference between the output image $\hat{I}_t$ and the target image, i.e., the middle image $I_t$. The trained machine-learning model 170 obtained in this way can be used to denoise images, when receiving two input images. As will be explained later, this can either be only denoising or also, in addition to denoising, interpolation. Note that the training can also be generalized to predict multiple intermediate (interpolated) images between two images. [what has to be considered in training when multiple intermediate images shall be predicted?]

In an embodiment, the target image is obtained from the middle image $I_t$ by applying a random shift to the middle image $I_t$. Applying a (random) shift to an image can be performed by means of data augmentation. This allows removing pixel-dependent noise (the non-i.i.d noise) by means of the trained machine-learning model. Assuming the pixel-dependent noise has no correlation in X and Y directions (two lateral directions of a 2D image), the model can be trained with a loss function $\mathcal{L}_2$ as follows:

$$\mathcal{L}_2 = \sum_t \|I_t - \hat{I}_t\| = \sum_t \|I_t(x+\delta_x, y+\delta_y, z) - \hat{I}_t(x, y, z)\|$$

where $\delta_x$ and $\delta_y$ are random variables, with $\delta_x, \delta_y \in \{-1, 0, +1\}$ (pixel size). This means that the middle image $I_t$ is shifted by +/−1 pixel in X and Y direction, to obtain the target image. The shifting can be applied to Z direction as well, if 3D images are used.

Figure 2:
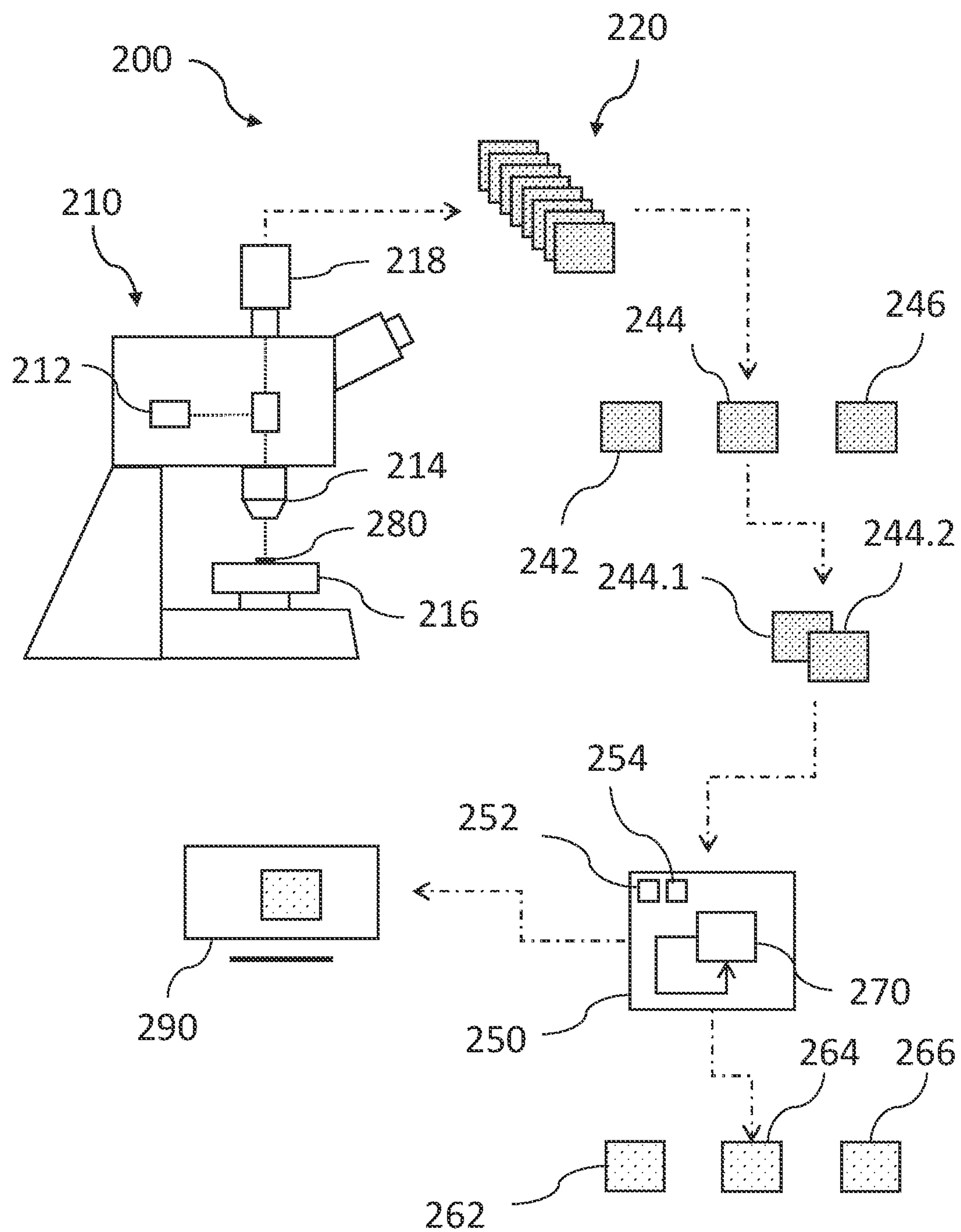
FIG. 2 schematically shows a system according to another embodiment of the invention.

FIG. 2 schematically illustrates a system 250 for generating a denoised image by applying a machine-learning model 270 according to an embodiment of the invention, within an exemplary arrangement 200. The machine-learning model 270, can for example, be the trained machine-learning model obtained as described with regard to FIG. 1. The arrangement 200 comprises a microscope 210, the system 250, and a display 290. The system 250 comprises one or more processors 252 and one or more storage devices 254. For example, system 250 can be a computer or other server system.

The system 250 is configured to receive input data; such input data comprises two input images 244.1, 244.2 obtained from a series 220 of consecutive images. In an embodiment, the series 220 is obtained by means of the microscope 210. The microscope 210 comprises, in an embodiment, an illumination optic 212 (comprising, e.g., a light source), an objective lens 214, a sample stage 216 and an image detector 218, e.g., a camera. A sample 280, e.g., a living sample, can be provided on the microscope stage 216, and illuminated and imaged by means of the microscope 210. For example, a time lapse experiment can be performed by means of the microscope 210, generating images of the sample 280. These images can form the series 220 of consecutive images and an, for example, be stored in a database (not shown here).

In an embodiment, one or more images of the series, or each image of the series 220 can be denoised. By means of example, three subsequent images 242, 244, 246 of this series 220 are illustrated. Denoising can, in an example, be the same procedure for each image. By means of example, image 244 shall be denoised. It is noted that het images or the series 220 does not necessarily be stored but can also directly be fed to the system 250. If the images or the series 220 are stored, the images can, for example, be individually be obtained from the database.

In an embodiment, for generating the denoised image from the individual image 244, the two input images 244.1, 244.2 to be provided to the machine-learning model 270 are two copies of the individual image 244. This is equivalent to providing the image 244 to the machine-learning model 270 twice. The reason as to why to copies are provided is that the machine-learning model 270 requires two input images.

The system 250 is further configured to apply the machine-learning model 270 to the two input images 244.1, 244.2 in order to obtain a denoised image 264. Denoised image 264 is the output of the machine-learning model 270 and typically corresponds (as to its content) to the image 244 but being denoised. The system 250 is further configured to provide output data, wherein the output data comprises the denoised image 264. The denoised image 264 can, for example, be displayed on the display 290 and/or be stored in a databased or the like. As mentioned, in this way each image of the series 220 can be denoised individually. For example, image 242 can be denoised to obtained denoised image 262 and image 246 can be denoised to obtain denoised image 262. The denoised images can have the same order as the images in the series 220. This means that a series of consecutive denoised images can be obtained.

Figure 3:
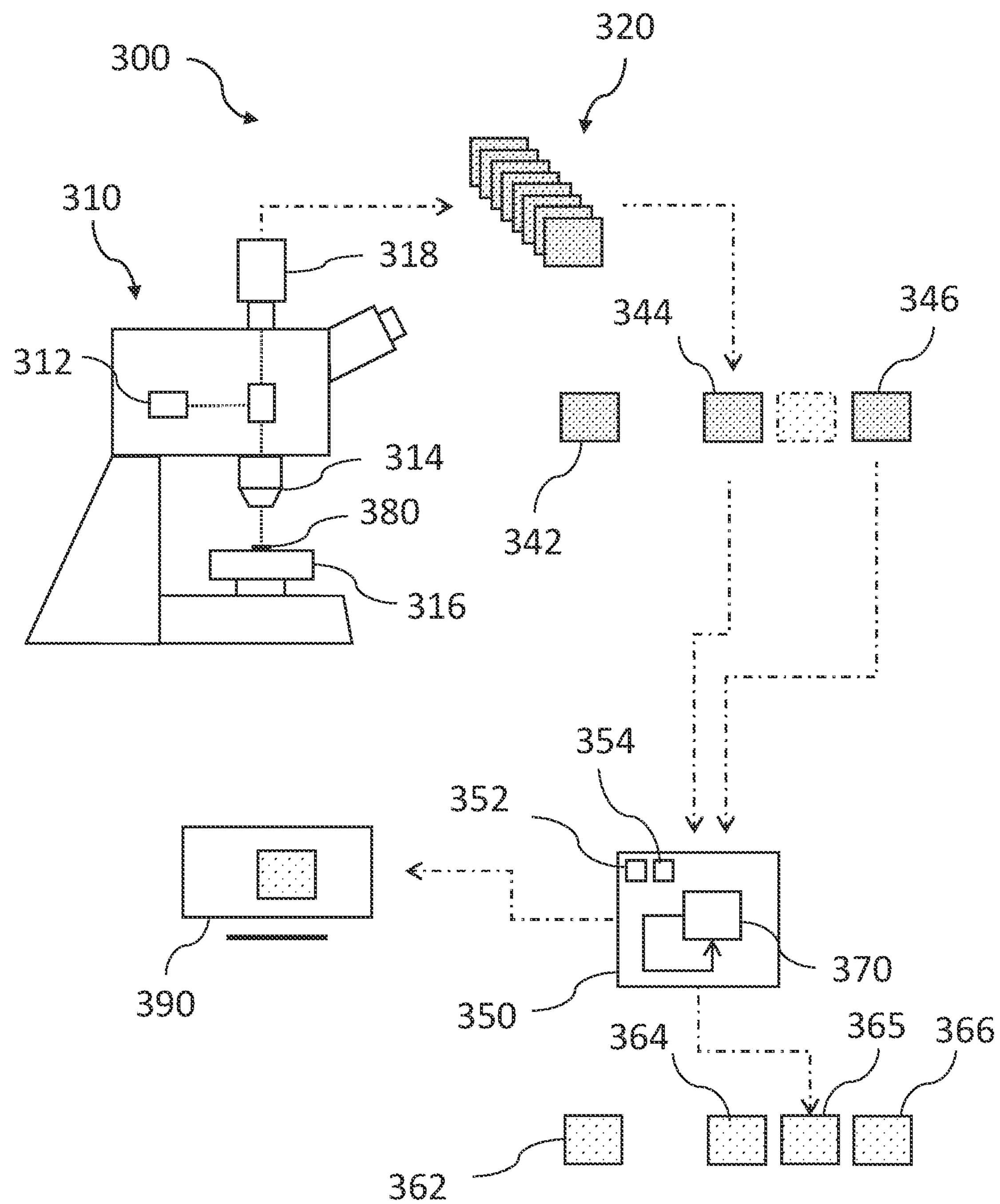
FIG. 3 schematically shows a system according to another embodiment of the invention.

FIG. 3 schematically illustrates a system 350 for generating a denoised image by applying a machine-learning model 370 according to an embodiment of the invention, within an exemplary arrangement 300. The machine-learning model 370, can for example, be the trained machine-learning model obtained as described with regard to FIG. 1. The arrangement 300 comprises a microscope 310, the system 350, and a display 390. The system 350 comprises one or more processors 352 and one or more storage devices 354. For example, system 350 can be a computer or other server system.

The system 350 is configured to receive input data; such input data comprises two input images 344, 364 obtained from a series 320 of consecutive images. In an embodiment, the series 320 is obtained by means of the microscope 310. The microscope 310 comprises, in an embodiment, an illumination optic 312 (comprising, e.g., a light source), an objective lens 314, a sample stage 316 and an image detector 318, e.g., a camera. A sample 380, e.g., a living sample, can be provided on the microscope stage 316, and illuminated and imaged by means of the microscope 210. For example, a time lapse experiment can be performed by means of the microscope 210, generating images of the sample 380. These images can form the series 320 of consecutive images and an, for example, be stored in a database (not shown here).

In an embodiment, for generating the denoised image as an interpolated image 365, the two input images 344, 346 to be provided to the machine-learning model 370 are two different images. For example, the two images are two subsequent images from the series 320.

The system 350 is further configured to apply the machine-learning model 370 to the two input images 344, 346 in order to obtain a denoised and interpolated image 365. Denoised and interpolated image 365 is the output of the machine-learning model 370 and typically corresponds (as to its content) an interpolation (kind of mixture) between the two input images 344 and 346 and being denoised. This is illustrated in FIG. 3 in that denoised and interpolated image 365 is shown between two images 364 and 366, and in that a theoretical image between images 344 and 346 is indicated (but is not present in reality).

The system 350 is further configured to provide output data, wherein the output data comprises the denoised and interpolated image 365. The denoised image 365 can, for example, be displayed on the display 390 and/or be stored in a databased or the like. In this way a denoised and interpolated image can be generated between each of two (in particular subsequent) images of the series 320.

In addition to obtain denoised and interpolated images for the series 320, each (or only some) of the individual images of the series 320 can also be denoised. Denoising individual images can be performed as explained with respect to FIG. 2. In this way, a series of consecutive denoised images with additional denoised interpolated images can be obtained. The additional denoised interpolated images can, for example, be inserted between the respective denoised individual images. In this way, the temporal resolution for the series 320 can be increased.

It is noted that the same machine-learning model can be used for generating a denoised image from an individual image and for generating a denoised and interpolated image from two different images, i.e., machine-learning model 270 of FIG. 2 and machine-learning model 370 can (but do not need to) be identical. The reason is that the machine-learning model operates on two input images and the output of the machine-learning model depends on the input images. While two copies of an individual image necessarily lead to the individual image being denoised, as there is not content that might be mixed up, two different images lead to a denoised and interpolated image.

Figure 4:
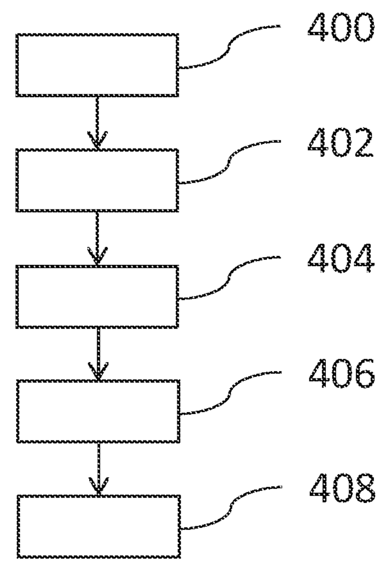
FIG. 4 schematically shows a method according to another embodiment of the invention in a flow diagram.

FIG. 4 schematically illustrates a method according to another embodiment of the invention in a flow diagram. The method relates to a computer-implemented method for training of a machine-learning algorithm for denoising images. The machine-learning algorithm is configured to generate an output image based on two input images, as has also been explained with respect to FIG. 1.

The method comprises, in a step 400, receiving training data 402. The training data 402 comprises multiple image sets obtained from one or more series of consecutive images. Each image set comprises a plurality of images obtained from the one or from the same of the more series of consecutive images, wherein the plurality of images of each image set comprise an initial image, a middle image and a last image. For further explanation of the training data, it is referred to FIG. 1 and the corresponding description.

The method further comprises, in a step 404, adjusting weights 406 of the machine-learning algorithm to obtain a trained machine-learning model. The adjusting is based on an output image of the machine-learning algorithm and a target image, wherein the output image of the of the machine-learning algorithm is obtained by using the initial image and the last image as input images, and wherein the target image is based on the middle image. For further explanation of the adjusting, it is referred to FIG. 1 and the corresponding description. The method further comprises, in a step 408, providing the trained machine learning model.

Figure 5:
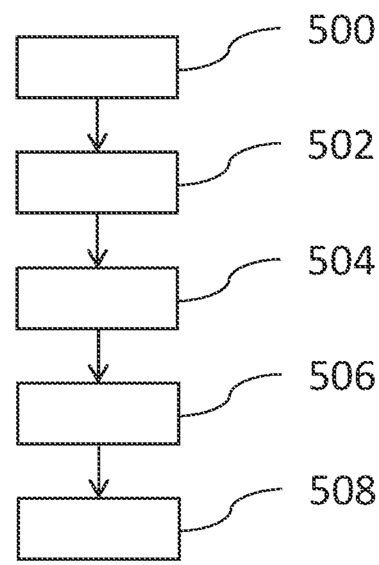
FIG. 5 schematically shows a method according to another embodiment of the invention in a flow diagram.

FIG. 5 schematically illustrates a method according to another embodiment of the invention in a flow diagram. The method relates to a computer-implemented method for denoising an image, using or applying a machine-learning model, as has also been explained with respect to FIG. 2.

The method comprises, in a step 500, receiving input data 502. The input data 502 comprises two input images obtained from a series of consecutive images. In an embodiment, the two input images are two copies of an individual image of the series. In another embodiment, the two input images are two different images of the series.

The method further comprises, in a step 504, applying the machine-learning model to the two input images in order to obtain a denoised image. If the two input images are two copies of an individual image, the obtained image is (only) denoised. If the two input images are two different images, the obtained image is denoised and interpolated. The method further comprises, in a step 506, providing output data 508, wherein the output data 508 comprises the denoised image or the denoised and interpolated images, depending on the two input images used.

As used herein the term "and/or" includes any and all combinations of one or more of the associated listed items and may be abbreviated as "/".

Although some aspects have been described in the context of an apparatus or system, it is clear that these aspects also represent a description of the corresponding method, where a block or device corresponds to a method step or a feature of a method step. Analogously, aspects described in the context of a method step also represent a description of a corresponding block or item or feature of a corresponding apparatus or system.

Some embodiments relate to a microscope comprising a system as described in connection with one or more of the FIGS. 1 to 3. Alternatively, a microscope may be part of or connected to a system as described in connection with one or more of the FIGS. 1 to 3. FIGS. 1, 2, 3 show a schematic illustration of an arrangement 100, 200, 300 configured to perform a method described herein. The arrangement 100, 200, 300 comprises a microscope 110, 210, 310 and a system or computer system 150, 250, 350. The microscope 110, 210, 310 is configured to take images and is connected to the computer system 150, 250, 350. The computer system 150, 250, 350 is configured to execute at least a part of a method described herein. The computer system 150, 250, 350 may be configured to execute a machine learning algorithm. The computer system 150, 250, 350 and microscope 110, 210, 310 may be separate entities but can also be integrated together in one common housing. The computer system 150, 250, 350 may be part of a central processing system of the microscope 110, 210, 310 and/or the computer system 150, 250, 350 may be part of a subcomponent of the microscope 110, 20, 310, such as a sensor, an actor, a camera or an illumination unit, etc. of the microscope 110, 210, 310.

The computer system 150, 250, 350 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 150, 250, 350 may comprise any circuit or combination of circuits. In one embodiment, the computer system 150, 250, 350 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 150, 250, 350 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 150, 250, 350 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 150, 250, 350 may also include a display device, one or more speakers, and a keyboard and/or controller, which can include a mouse, trackball, touch screen, voice-recognition device, or any other device that permits a system user to input information into and receive information from the computer system 150, 250, 350.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

Embodiments may be based on using a machine-learning model or machine-learning algorithm. Machine learning may refer to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and/or training sequences (e.g. words or sentences) and associated training content information (e.g. labels or annotations), the machine-learning model "learns" to recognize the content of the images, so the content of images that are not included in the training data can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model. The provided data (e.g. sensor data, meta data and/or image data) may be preprocessed to obtain a feature vector, which is used as input to the machine-learning model.

Machine-learning models may be trained using training input data. The examples specified above use a training method called "supervised learning". In supervised learning, the machine-learning model is trained using a plurality of training samples, wherein each sample may comprise a plurality of input data values, and a plurality of desired output values, i.e. each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm (e.g. a classification algorithm, a regression algorithm or a similarity learning algorithm. Classification algorithms may be used when the outputs are restricted to a limited set of values (categorical variables), i.e. the input is classified to one of the limited set of values. Regression algorithms may be used when the outputs may have any numerical value (within a range). Similarity learning algorithms may be similar to both classification and regression algorithms but are based on learning from examples using a similarity function that measures how similar or related two objects are. Apart from supervised or semi-supervised learning, unsupervised learning may be used to train the machine-learning model. In unsupervised learning, (only) input data might be supplied and an unsupervised learning algorithm may be used to find structure in the input data (e.g. by grouping or clustering the input data, finding commonalities in the data). Clustering is the assignment of input data comprising a plurality of input values into subsets (clusters) so that input values within the same cluster are similar according to one or more (pre-defined) similarity criteria, while being dissimilar to input values that are included in other clusters.

Reinforcement learning is a third group of machine-learning algorithms. In other words, reinforcement learning may be used to train the machine-learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is increased, leading to software agents that become better at the task they are given (as evidenced by increasing rewards).

Furthermore, some techniques may be applied to some of the machine-learning algorithms. For example, feature learning may be used. In other words, the machine-learning model may at least partially be trained using feature learning, and/or the machine-learning algorithm may comprise a feature learning component. Feature learning algorithms, which may be called representation learning algorithms, may preserve the information in their input but also transform it in a way that makes it useful, often as a pre-processing step before performing classification or predictions. Feature learning may be based on principal components analysis or cluster analysis, for example.

In some examples, anomaly detection (i.e. outlier detection) may be used, which is aimed at providing an identification of input values that raise suspicions by differing significantly from the majority of input or training data. In other words, the machine-learning model may at least partially be trained using anomaly detection, and/or the machine-learning algorithm may comprise an anomaly detection component.

In some examples, the machine-learning algorithm may use a decision tree as a predictive model. In other words, the machine-learning model may be based on a decision tree. In a decision tree, observations about an item (e.g. a set of input values) may be represented by the branches of the decision tree, and an output value corresponding to the item may be represented by the leaves of the decision tree. Decision trees may support both discrete values and continuous values as output values. If discrete values are used, the decision tree may be denoted a classification tree, if continuous values are used, the decision tree may be denoted a regression tree.

Association rules are a further technique that may be used in machine-learning algorithms. In other words, the machine-learning model may be based on one or more association rules. Association rules are created by identifying relationships between variables in large amounts of data. The machine-learning algorithm may identify and/or utilize one or more relational rules that represent the knowledge that is derived from the data. The rules may e.g. be used to store, manipulate or apply the knowledge.

Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge (e.g. based on the training performed by the machine-learning algorithm). In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a retina or a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of its inputs (e.g. of the sum of its inputs). The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input.

Alternatively, the machine-learning model may be a support vector machine, a random forest model or a gradient boosting model. Support vector machines (i.e. support vector networks) are supervised learning models with associated learning algorithms that may be used to analyze data (e.g. in classification or regression analysis). Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100, 200, 300 arrangement
110, 210, 310 microscope
112, 212, 312 illumination optic
114, 214, 314 objective lens
116, 216, 316 sample stage
118, 218, 318 image detector
120, 122, 220, 320 series of consecutive images
130 database
140 set of images
142 initial images
144 middle image
146 last image
150, 250, 350 system
152, 252, 352 processor
154, 254, 354 storage device
160 machine-learning algorithm
162, 166 input images
164 target image
168 output image
170, 270, 370 machine-learning model
180, 280, 380 sample
242, 244, 246 images
244.1, 244.1 copies of image
262, 264, 266 denoised images
290, 390 display
344, 346 images
362, 364, 366 denoised images
365 denoised and interpolated image
400-408, 500-508 method steps

The invention claimed is:

1. A system comprising one or more processors and one or more storage devices for training a machine-learning algorithm for denoising images, the system configured to:

receive training data, the training data comprising multiple image sets obtained from one or more series of consecutive images, wherein each image set comprises a plurality of images obtained from a same series of the one or more series of consecutive images, wherein the plurality of images of each image set comprise an initial image, a middle image and a last image;

adjust weights of the machine-learning algorithm to obtain a trained machine-learning model, based on an output image of the machine-learning algorithm and a target image, wherein the output image of the machine-learning algorithm is obtained by using the initial image and the last image as input images, and wherein the target image is obtained from the middle image by applying a random shift to the middle image; and provide the trained machine-learning model.

2. The system of claim 1, wherein adjusting the weights of the machine-learning algorithm to obtain the trained machine-learning model, based on the output image of the machine-learning algorithm and the target image is performed by minimizing a difference between the output image and the target image.

3. The system of claim 1, wherein the plurality of images of each image set are consecutive images of the respective series of consecutive images.

4. The system of claim 1, wherein the one or the more series of consecutive images are obtained from at least one of: time lapse imaging, or one or more videos.

5. The system of claim 1, wherein the training data comprises noisy images.

6. The system of claim 1, wherein the machine-learning algorithm comprises a convolutional network or a deep convolutional network.

7. A computer-implemented method for training a machine-learning algorithm for denoising images, the method comprising:

receiving training data, the training data comprising multiple image sets obtained from one or more series of consecutive images, wherein each image set comprises a plurality of images obtained from a same series of the one or more series of consecutive images, wherein the plurality of images of each image set comprise an initial image, a middle image and a last image;

adjusting weights of the machine-learning algorithm to obtain a trained machine-learning model, based on an output image of the machine-learning algorithm and a target image, wherein the output image of the of the machine-learning algorithm is obtained by using the initial image and the last image as input images, and wherein the target image is obtained from the middle image by applying a random shift to the middle image; and providing the trained machine learning model.

8. A non-transitory computer-readable medium storing a trained machine-learning model for denoising images, wherein the machine-learning model is trained using one or more processors by executing the follow steps:

receiving training data, the training data comprising multiple image sets obtained from one or more series of consecutive images, wherein each image set comprises a plurality of images obtained from a same series of the one or more series of consecutive images, wherein the plurality of images of each image set comprise an initial image, a middle image and a last image; and adjusting weights of a machine learning algorithm to obtain the trained machine-learning model, based on an output image of the machine-learning algorithm and a target image, wherein the output image of the of the machine-learning algorithm is obtained by using the initial image and the last image as input images, and the target image is obtained from the middle image by applying a random shift to the middle image.

9. A system comprising one or more processors and one or more storage devices, for generating a denoised image by applying a machine-learning model, wherein the system is configured to:

receive input data, the input data comprising two input images obtained from a series of consecutive images, apply the machine-learning model to the two input images in order to obtain a denoised image; and provide output data, the output data comprising the denoised image, wherein the machine-learning model is trained by:

receiving training data, the training data comprising multiple image sets obtained from one or more series of consecutive images, wherein each image set comprises a plurality of images obtained from a same series of the one or more series of consecutive images, wherein the plurality of images of each image set comprise an initial image, a middle image and a last image; and adjusting weights of a machine learning algorithm to obtain the trained machine-learning model, based on an output image of the machine-learning algorithm and a target image, wherein the output image of the machine-learning algorithm is obtained by using the initial image and the last image as input images, and the target image is obtained from the middle image by applying a random shift to the middle image.

10. The system of claim 9, wherein the two input images are two copies of an individual image.

11. The system of claim 9, wherein the two input images are two different images, and wherein the denoised image is an interpolated image based on the two input images.

12. The system of claim 10, wherein the two input images are two consecutive images of the series of consecutive images.

13. The system of claim 9, wherein the two input images are obtained from time lapse imaging or from a video.

14. The system of claim 9, wherein the two input images are obtained from time lapse imaging of one or more living samples.

15. A computer-implemented method for denoising an image by applying a machine-learning model, the method comprising:

receiving input data, the input data comprising two input images obtained from a series of consecutive images, applying the machine-learning model to the two input images in order to obtain a denoised image; and providing output data, the output data comprising the denoised image, wherein the machine-learning model is trained by:

receiving training data, the training data comprising multiple image sets obtained from one or more series of consecutive images, wherein each image set comprises a plurality of images obtained from a same series of the one or more series of consecutive images, wherein the plurality of images of each image set comprise an initial image, a middle image and a last image; and adjusting weights of a machine learning algorithm to obtain the trained machine-learning model, based on an output image of the machine-learning algorithm and a target image, wherein the output image of the machine-learning algorithm is obtained by using the initial image and the last image as input images, and the target image is obtained from the middle image by applying a random shift to the middle image.

16. The method of claim 15, wherein the two input images are two copies of a single image.

17. A non-transitory computer-readable medium having a program code stored thereon, the program code, when executed by a computer processor, causing performance of the method of claim 7.

* * * * *